US008709575B2

(12) United States Patent  (10) Patent No.: US 8,709,575 B2
Marissen et al.  (45) Date of Patent: Apr. 29, 2014

(54) MULTILAYERED MATERIAL SHEET AND PROCESS FOR ITS PREPARATION

(75) Inventors: Roelof Marissen, Born (NL); Joseph Arnold Paul Maria Simmelink, Sittard (NL); Reinard Jozef Maria Steeman, Elsloo (NL); Gijsbertus Hendrikus Maria Calis, Hulsberg (NL); Jacobus Johannes Mencke, Maastricht (NL); Jean Hubert Marie Beugels, Landgraaf (NL); David Vanek, Charlotte, NC (US); Johann Van Elburg, Landgraaf (NL); Alexander Volker Peters, Aachen (DE); Steen Tanderup, Maastricht (NL); Marko Dorschu, Beek (NL)

(73) Assignee: DSM IP Assets B.V., Heerlen (NL)

( * ) Notice: Subject to any disclaimer, the term of this patent is extended or adjusted under 35 U.S.C. 154(b) by 626 days.

(21) Appl. No.: 12/298,621

(22) PCT Filed: Apr. 26, 2007

(86) PCT No.: PCT/EP2007/003684
§ 371 (c)(1),
(2), (4) Date: Apr. 9, 2009

(87) PCT Pub. No.: WO2007/122009
PCT Pub. Date: Nov. 1, 2007

(65) Prior Publication Data
US 2009/0311466 A1  Dec. 17, 2009

Related U.S. Application Data

(60) Provisional application No. 60/876,545, filed on Dec. 22, 2006.

(30) Foreign Application Priority Data

Apr. 26, 2006 (EP) ................................. 06008600
Jun. 29, 2006 (EP) ................................. 06013452
Dec. 22, 2006 (EP) ................................. 06026723

(51) Int. Cl.
*B32B 5/12* (2006.01)
*B32B 5/26* (2006.01)
*B32B 37/12* (2006.01)
*B32B 38/00* (2006.01)

(52) U.S. Cl.
USPC ........ 428/105; 139/383 R; 428/107; 428/156; 428/213; 428/364; 429/144

(58) Field of Classification Search
USPC .................. 428/156, 107, 213, 364; 139/383, 139/383 R; 429/144
See application file for complete search history.

(56) References Cited

U.S. PATENT DOCUMENTS

| | | | |
|---|---|---|---|
| 3,924,038 A | 12/1975 | McArdle et al. | |
| 4,276,348 A | 6/1981 | Wu et al. | |
| 4,413,110 A | 11/1983 | Kavesh et al. | |
| 4,836,084 A | 6/1989 | Vogelesang et al. | |
| 4,931,126 A * | 6/1990 | McCarville et al. | 156/304.6 |
| 5,032,338 A | 7/1991 | Weedon et al. | |
| 5,128,415 A | 7/1992 | Bastiaansen et al. | |
| 5,308,424 A | 5/1994 | Sasaki et al. | |
| 5,376,426 A | 12/1994 | Harpell et al. | |
| 5,635,288 A | 6/1997 | Park | |
| 5,736,244 A | 4/1998 | Kavesh et al. | |
| 6,183,834 B1 | 2/2001 | van der Loo | |
| 6,448,359 B1 | 9/2002 | Kavesh | |
| 2002/0124900 A1 * | 9/2002 | Khokar | 139/11 |
| 2004/0086729 A1 | 5/2004 | Nguyen et al. | |
| 2005/0089677 A1 | 4/2005 | Marissen et al. | |
| 2006/0051564 A1 | 3/2006 | Jacobs et al. | |
| 2006/0069185 A1 | 3/2006 | He et al. | |
| 2006/0210749 A1 | 9/2006 | Geva et al. | |
| 2006/0252325 A1 | 11/2006 | Matsumura et al. | |
| 2007/0293109 A1 | 12/2007 | Bhatnagar et al. | |

FOREIGN PATENT DOCUMENTS

| | | |
|---|---|---|
| EP | 0 187 974 | 7/1986 |
| EP | 0 191 306 | 8/1986 |
| EP | 0 205 960 | 12/1986 |
| EP | 0 488 465 | 6/1992 |
| EP | 0 533 239 | 3/1993 |
| EP | 0 683 374 | 11/1995 |
| EP | 0 733 460 | 9/1996 |
| EP | 0 269 151 | 6/2001 |
| EP | 1 144 740 | 10/2001 |
| EP | 1 170 925 | 1/2002 |
| EP | 1 574 811 | 9/2005 |
| EP | 1 627 719 | 2/2006 |

(Continued)

OTHER PUBLICATIONS

International Search Report for PCT/EP2007/003684, mailed Aug. 22, 2007.

(Continued)

*Primary Examiner* — Brent O'Hern
(74) *Attorney, Agent, or Firm* — Nixon & Vanderhye P.C.

(57) ABSTRACT

The invention relates to a multilayered material sheet comprising a consolidated stack of unidirectional monolayers of drawn polymer, whereby the draw direction of two subsequent monolayers in the stack differs. At least one monolayer comprises a plurality of unidirectional tapes of the drawn polymer, aligned in the same direction, whereby adjacent tapes do not overlap. The invention also relates to a process for the preparation of the multilayered material sheet, and to a ballistic resistant article comprising the multilayered material sheet.

20 Claims, 3 Drawing Sheets

(56) References Cited

FOREIGN PATENT DOCUMENTS

| | | |
|---|---|---|
| EP | 1627719 A1 * | 2/2006 |
| GB | 2 042 414 | 9/1980 |
| GB | 2 051 667 | 1/1981 |
| JP | 4-222398 | 8/1992 |
| JP | 7-198299 | 8/1995 |
| JP | 8-47994 | 2/1996 |
| JP | 2003-27483 | 1/2003 |
| KR | 10-2004-0013881 | 2/2004 |
| KR | 10-2007-0065940 | 6/2007 |
| WO | 88/03184 | 5/1988 |
| WO | 93/20271 | 10/1993 |
| WO | 94/19660 | 9/1994 |
| WO | 97/00766 | 1/1997 |
| WO | 00 42246 | 7/2000 |
| WO | 00/48821 | 8/2000 |
| WO | 01/59395 | 8/2001 |
| WO | 01/73173 | 10/2001 |
| WO | 2004/028803 | 4/2004 |
| WO | 2004/033196 | 4/2004 |
| WO | 2005/066400 | 7/2005 |
| WO | 2005/066401 | 7/2005 |
| WO | 2005/066577 | 7/2005 |
| WO | 2006/002977 | 1/2006 |
| WO | 2006/073743 | 7/2006 |
| WO | 2007/003334 | 1/2007 |

OTHER PUBLICATIONS

Advanced Fiber Spinning Technology, Ed. T. Nakajima, Woodhead Publications Ltd (1994), ISBN 185573 182 7.

* cited by examiner

MULTILAYERED MATERIAL SHEET AND PROCESS FOR ITS PREPARATION

This application is the U.S. national phase of International Application No. PCT/EP2007/003684, filed 26 Apr. 2007, which designated the U.S. and claims priority to Europe Application No(s). 06008600.6, filed 26 Apr. 2006, 06013452.5, filed 29 Jun. 2006, 06026723.4, filed 22 Dec. 2006 and US Application No. 60/876,545 filed 22 Dec. 2006, the entire contents of each of which are hereby incorporated by reference.

FIELD

The invention relates to a multilayered material sheet comprising a consolidated stack of unidirectional monolayers of drawn polymer, and to its process of preparation. The invention also relates to a ballistic resistant article comprising the multilayered material sheet.

BACKGROUND AND SUMMARY

A multilayered material sheet comprising a consolidated stack of unidirectional monolayers of drawn polymer is known from EP 1627719 A1. This publication discloses a multilayered material sheet comprising a plurality of unidirectional monolayers consisting of ultra high molecular weight polyethylene and essentially devoid of bonding matrices, whereby the draw direction of two subsequent monolayers in the stack differs. A monolayer of the multilayered material disclosed in EP 1627719 A1 is produced by positioning a plurality of tapes of ultra high molecular weight polyethylene adjacent to each other whereby adjacently positioned tapes overlap at least partly along their side edges. Without the overlap the known multilayered material cannot be produced. Also, in order to obtain good antiballistic properties, the material sheet of EP 1627719 A1 makes use exclusively of ultrahigh molecular weight polyethylene, essentially free from bonding matrices.

Although the multilayered material sheet according to EP 1627719 A1 shows a satisfactory ballistic performance, this performance can be improved further.

The object of the present invention is to provide a multilayered material sheet having at least similar antiballistic properties as the known material, and which sheet can be easily produced.

This object is achieved according to the invention by providing a multilayered material sheet comprising a consolidated stack of unidirectional monolayers of drawn polymer, whereby the draw direction of two subsequent monolayers in the stack differs, whereby at least one monolayer comprises at least one unidirectional tape of the drawn polymer, each tape comprises longitudinal edges, whereby the monolayer is free from overlaps, or free of an area of elevated thickness adjacent to and along the substantial length of the longitudinal edges. Preferably, the monolayer is free from overlaps, or free of the area of elevated thickness adjacent to and along at least 50%, 60%, 70%, 80%, 90% or 95% of the length of the longitudinal edges of the at least one unidirectional tape. Most preferably, the monolayer is free from overlaps, or free of an area of elevated thickness along and adjacent to the entire length of the longitudinal edges of the at least one unidirectional tape.

The formation of monolayers which are free from overlaps or excessive levels of binders enable the monolayers to be more readily stacked and compressed into a multilayered material sheet with uniform areal density resulting in a more homogeneous antiballistic performance across the multilayered material sheet.

In one embodiment of the present invention, this objective is achieved by a multilayered material sheet and a process to produce such multilayered material sheet, the sheet comprising a consolidated stack of unidirectional monolayers of drawn polymer, whereby the draw direction of two subsequent monolayers in the stack differs, whereby at least one monolayer comprises a plurality of unidirectional tapes of the drawn polymer, aligned in the same direction, and whereby adjacent tapes do not overlap.

It turns out that a multilayer material sheet according to the invention, i.e. a sheet wherein areas of elevated thickness adjacent to and along the longitudinal edges of the unidirectional tapes e.g. longitudinal overlaps of tapes or tapes extensively bound together with overlapping binding material are substantially absent, not only improves the antiballistic properties of the sheet, but does so to an unexpectedly high extent. Preferably, the monolayer is free of an area of elevated thickness which extends along (rather than transverses across) and adjacent to the longnitudinal edges of the at least one unidirectional tape. The occurrence of areas of elevated thickness which extends along and adjacent to the longitudinal edges of the unidirectional tape or unidirectional tapes are more difficult to form a homogeneous consolidated stack compared to areas of elevated thickness attributed to the transverse overlapping of unidirectional tapes, such as that observed when the tapes are aligned such that they form a woven structure.

DETAILED DESCRIPTION OF PRFERRED EMBODIMENTS

A particularly preferred multilayer material sheet according to the invention comprises a stack of monolayers, whereby each monolayer is built up of a plurality of unidirectional tapes of the drawn polymer, aligned in the same direction, and whereby in each monolayer adjacent tapes do not overlap. A material sheet according to the invention is more homogeneous than the known material sheet. Indeed, at the locations of overlap, the known material sheet will have zones of increased areal density. These zones are absent or occur to a lesser extent in the material sheet of the invention. This feature surprisingly improves antiballistic properties.

A monolayer of the multilayer material sheet of the invention is preferably produced by positioning a plurality of tapes with their longitudinal edges as close as possible to each other, and preferably in touching proximity. However, in order to be able to produce a monolayer on an industrial scale at economical speeds, it would be desirable to allow a gap between adjacent tapes (i.e the adjacent tapes in a monolayer are not it contact along their longitudinal edges—gap of greater than 0%). Preferably, the material sheet according to the invention is characterized in that the gap between adjacent tapes in a monolayer is smaller than 10% of the width of the adjacent unidirectional tapes, and even more preferred smaller than 5%, still even more preferred 3% of the width of the adjacent unidirectional tapes. Most preferably the gap between adjacent tapes in a monolayer is smaller than 1%.

A material sheet according to this preferred embodiment is readily produced and yet shows antiballistic properties of similar level as material sheets without gaps. Although a monolayer according to the invention is preferably produced by positioning a plurality of tapes with their longitudinal edges against each other, monolayers built from just one (wide enough) tape of sufficient width also fall within the scope of the invention, since such a monolayer does not show areas of elevated thickness adjacent to and along the length of the longitudinal edges of the at least one unidirectional tape.

By aligning the plurality of drawn polymer tapes such that each tape is oriented in parallel to adjacent tapes, and such that a substantial amount, i.e. at least 90% of adjacent tapes does not overlap, an improved antiballistic performance is achieved over known materials. According to the prior art, as described in EP 1627719 A1, the unidirectional monolayers comprise a plurality of high-strength unidirectional polyethylene tapes, oriented in parallel in one plane but partially overlapping, the overlapping area being of the order of 5 mm to 40 mm wide. According to an alternative embodiment, a narrow polymeric film, about 5 to 20 mm wide, is laid over the area of contact between two adjacent tapes. An additional advantage of the multilayer material sheet of a preferred embodiment of the present invention is that there is no need for such additional polymeric films, in order to obtain good antiballistic properties. Further, through having tapes which are free of areas of elevated thickness, as defined in the present invention, the subsequent stacking and consolidation of the monolayers under pressure will result in a more homogeneous areal density or thickness in the multilayered material sheet compared to the prior art.

A particularly preferred embodiment of the multilayer material sheet according to the invention is characterized in that the polymer from which it is made is selected from the group consisting of polyolefins, polyesters, polyvinyl alcohols, polyacrylonitriles, polyamides, especially poly(p-phenylene teraphthalamide), liquid crystalline polymers and ladder-like polymers, such as polybenzimidazole or polybenzoxazole, especially poly(1,4-phenylene-2,6-benzobisoxazole), or poly(2,6-diimidazo[4,5-b-4',5'-e]pyridinylene-1,4-(2,5-dihydroxy)phenylene). Unidirectional tapes and monolayers from these polymers are preferably highly oriented by drawing material forms, for instance films, at a suitable temperature. With unidirectional tapes and monolayers is meant in the context of this application tapes and monolayers which show a preferred orientation of the polymer chains in one direction, i.e. in the direction of drawing. Such tapes and monolayers may be produced by drawing, preferably by uniaxial drawing, and will exhibit anisotropic mechanical properties.

The multilayered material sheet of the invention allows the use of drawn polymers with relatively low strength, and therefore does not need ultra high molecular weight polyethylene to obtain good antiballistic performance. However a preferred embodiment thereof comprises ultra high molecular weight polyethylene. The ultra high molecular weight polyethylene may be linear or branched, although preferably linear polyethylene is used. Linear polyethylene is herein understood to mean polyethylene with less than 1 side chain per 100 carbon atoms, and preferably with less than 1 side chain per 300 carbon atoms; a side chain or branch generally containing at least 10 carbon atoms. Side chains may suitably be measured by FTIR on a 2 mm thick compression moulded film, as mentioned in e.g. EP 0269151. The linear polyethylene may further contain up to 5 mol % of one or more other alkenes that are copolymerisable therewith, such as propene, butene, pentene, 4-methylpentene, octene. Preferably, the linear polyethylene is of high molar mass with an intrinsic viscosity (IV, as determined on solutions in decalin at 135° C.) of at least 4 dl/g; more preferably of at least 8 dl/g, most preferably of at least 10 dl/g. Such polyethylene is also referred to as ultra high molecular weight polyethylene. Intrinsic viscosity is a measure for molecular weight that can more easily be determined than actual molar mass parameters like Mn and Mw. A polyethylene film of this type yields particularly good antiballistic properties.

The tapes according to the invention may be prepared in the form of films. A preferred process for the formation of such films or tapes comprises feeding a polymeric powder between a combination of endless belts, compression-moulding the polymeric powder at a temperature below the melting point thereof and rolling the resultant compression-moulded polymer followed by drawing. Such a process is for instance described in EP 0 733 460 A2, which is incorporated herein by reference. If desired, prior to feeding and compression-moulding the polymer powder, the polymer powder may be mixed with a suitable liquid organic compound having a boiling point higher than the melting point of said polymer. Compression moulding may also be carried out by temporarily retaining the polymer powder between the endless belts while conveying them. This may for instance be done by providing pressing platens and/or rollers in connection with the endless belts. The UHMWPE polymer used in this process needs to be drawable in the solid state.

Another preferred process for the formation of films comprises feeding a polymer to an extruder, extruding a film at a temperature above the melting point thereof and drawing the extruded polymer film. If desired, prior to feeding the polymer to the extruder, the polymer may be mixed with a suitable liquid organic compound, for instance to form a gel, such as is preferably the case when using ultra high molecular weight polyethylene.

Drawing, preferably uniaxial drawing, of the produced films may be carried out by means known in the art. Such means comprise extrusion stretching and tensile stretching on suitable drawing units. To attain increased mechanical strength and stiffness, drawing may be carried out in multiple steps. In case of the preferred ultra high molecular weight polyethylene films, drawing is typically carried out uniaxially in a number of drawing steps. The first drawing step may for instance comprise drawing to a stretch factor of 3. Multiple drawing may typically result in a stretch factor of 9 for drawing temperatures up to 120° C., a stretch factor of 25 for drawing temperatures up to 140° C., and a stretch factor of 50 for drawing temperatures up to and above 150° C. By multiple drawing at increasing temperatures, stretch factors of about 50 and more may be reached. This results in high strength tapes, whereby for tapes of ultra high molecular weight polyethylene, strengths of 1.5 GPa to 1.8 GPa and more may be obtained.

The resulting drawn tapes may be used as such to produce a monolayer, or they may be cut to their desired width, or split along the direction of drawing. Preferably the monolayer is produced from tape that is not slitted. The width of the thus produced unidirectional tapes is only limited by the width of the film from which they are produced. The width of the tapes preferably is more than 2 mm, more preferably more than 5 mm and most preferably more than 30 mm. The areal density of the tapes or monolayers can be varied over a large range, for instance between 5 and 200 g/m². Preferred areal density is between 10 and 120 g/m², more preferred between 15 and 80 g/m² and most preferred between 20 and 60 g/m².

Another particularly preferred multilayer material sheet according to the invention comprises at least one monolayer, preferably all monolayers, built up of a plurality of unidirectional tapes of the drawn polymer, aligned such that they form a woven structure. Such tapes may be manufactured by applying textile techniques, such as weaving, braiding, etc. of small strips of drawn polymer, instead of on fibers, which is usually done. Although in this embodiment polymer strips do have areas of elevated thickness where the strips partly overlap at the crossover points, the areas of elevated thickness transverse the longitudinal edges of the unidirectional tape, rather than extend along and adjacent to the longitudinal edges. Each tape (being a woven fabric of small strips) is positioned such that no overlap occurs between adjacent tapes, aligned in the same direction. By stacking the tapes such that the seam lines in different monolayers are staggered with respect to each other, antiballistic properties are further improved.

In some embodiments the monolayer may include a binder which is locally applied to bond and stabilise the plurality of unidirectional tapes such that the structure of the mono-layer is retained during handling and making of unidirectional sheets. Suitable binders are described in e.g. EP 0191306 B1, EP 1170925 A1, EP 0683374 B1 and EP 1144740 A1. The binder may be applied in various forms and ways; for example as a transverse bonding strip (transverse with respect to the unidirectional tapes). The application of the binder during the formation of the monolayer advantageously stabilises the tapes, thus enabling faster production cycles to be achieved while avoiding overlaps between adjacent tapes.

In one embodiment, a binder is applied to fixingly abut adjacent unidirectional tapes along their longitudinal edges. As the role of the binder is to temporarily retain and stabilise the plurality unidirectional tapes during handling and making of unidirectional sheets, localised application of the binder is preferred. Local application of the binder is application that is restricted to the immediate vicinity of the longitudinal edges and may include intermittent localised application (spot application along the longitudinal edges).

Preferably, the application of the binder results in a maximum elevated thickness of the monolayer (raised edge) of 150% of the average thickness of the unidirectional tapes forming the monolayer. More preferably, the application of the binder results in a maximum elevated thickness of 120%, 110% or 105% of the average thickness of the plurality of unidirectional tapes forming the monolayer. In another embodiment, the application of the binder results in an increase in thickness of the monolayer adjacent to the longitudinal edges of the unidirectional tapes of less than 4 microns, more preferably less than 3, 2 or 1 microns.

In embodiments with intermittent localised application of the binder, the proportion of the longitudinal edges comprising the binder is preferably less than 50%, 30%, 20% 10%, 5% or 2%. Similarly, the proportion of the longitudinal edges (or areas adjacent to the longitudinal edges) of the unidirectional tape which is raised due to the application of the binder is preferably less than 50%, 30%, 20% 10%, 5% or 2%. Preferably, the binder comprises less than 20%, 10%, 5%, 2% 1%, 0.5%, or 0.2% of the weight of the monolayer or consolidated stack.

In alternative embodiments, a binding means, such as ultrasonic welding may be used to intermittently fuse sections of the longitudinal edges of the adjacent unidirectional tapes together.

With adjacent unidirectional tapes within a monolayer intermittently bound along adjoining longitudinal edges, the adjacent unidirectional tapes are maintained in a parallel arrangement. The application of the binder enables the adjacent unidirectional tapes to be in close proximity without substantial overlapping of adjoining longitudinal edges. The localised variation of thickness of the monolayer is advantageously reduced (compared to conventional monolayers with overlapping longitudinal edges or with continuous overlapping polymeric binding strips) which contributes to a resulting consolidated stack of monolayers with a more homogeneous thickness and hence stress distribution.

The thickness of the monolayers or tapes of the multilayered material sheet can in principle be selected within wide ranges. Preferably however, the multilayer material sheet according to the invention is characterized in that the thickness of at least one monolayer does not exceed 120 µm, more preferably does not exceed 50 µm, and most preferably is comprised between 5 and 29 µm. Particularly good antiballistic properties are achieved if the thickness of all monolayers of the stack does not exceed 120 µm, more preferably does not exceed 50 µm, and most preferably is comprised between 3 and 29 µm. A further preferred multilayered material sheet according to the invention is characterized in that the thickness of the at least one monolayer greater than 10 µm and not exceeding 50 µm, preferably not exceeding 100 µm or more preferably not exceeding 120 µm.

By limiting the thickness of at least one of the monolayers in the stack to the claimed thickness, sufficient antiballistic properties are surprisingly achieved even with monolayers having rather limited strengths.

The strength of the tapes in the multilayered material sheet largely depends on the polymer from which they are produced, and on their (uniaxial) stretch ratio. The strength of the tapes (and monolayers) is at least 0.75 GPa, preferably at least 0.9 GPa, more preferably at least 1.2 GPa, even more preferably at least 1.5 GPa, even more preferably at least 1.8 GPa, and even more preferably at least 2.1 GPa, and most preferably at least 3 GPa. The unidirectional monolayers are preferably sufficiently interconnected to each other, meaning that the unidirectional monolayers do not delaminate under normal use conditions such as e.g. at room temperature.

The multilayer material sheet according to the invention preferably comprises at least 2 unidirectional monolayers, preferably at least 4 unidirectional monolayers, more preferably at least 6 unidirectional monolayers, even more preferably at least 8 unidirectional monolayers and most preferably at least 10 unidirectional monolayers. Increasing the number of unidirectional monolayers in the multilayer material sheet of the invention simplifies the manufacture of articles form these material sheets, for instance antiballistic plates.

In one embodiment of the present invention, there is provided a process for the preparation of a multilayered material sheet comprising:
(a) positioning a first at least one drawn polymer unidirectional tape onto a moving substrate thereby forming a first monolayer, whereby the monolayer is free of an area of elevated thickness adjacent to and along the substantial length of the longitudinal edges of the at least one unidirectional tape;
(b) holding the first monolayer onto the moving substrate;
(c) positioning a second at least one drawn polymer unidirectional tape onto the first monolayer, thus forming a second monolayer, whereby the direction of the second monolayer makes an angle α with respect to the first; and
(d) compressing the thus formed stack to consolidate the monolayers thereof.

The consolidated stack of monolayers has more homogeneous thickness/areal density compared to the prior art, due to the reduction or absence of areas of elevated thickness along and adjacent to the longitudinal edges of the at least one unidirectional tapes in, preferably, each of the monolayers.

In a preferred embodiment of the present invention, there is provided a process for the preparation of a multilayered material sheet of the claimed type. The process according to the invention comprises the steps of:

(a) providing a plurality of drawn polymer tapes, aligned such that each tape is oriented in parallel to adjacent tapes, and whereby adjacent tapes do not substantially overlap;
(b) positioning said plurality of drawn polymer tapes onto a moving substrate thereby forming a first monolayer;
(c) holding the first monolayer onto the moving substrate;
(d) positioning a plurality of drawn polymer tapes onto the first monolayer, thus forming a second monolayer, whereby the direction of the second monolayer makes an angle α with respect to the first; and
(e) compressing the thus formed stack to consolidate the monolayers thereof.
Step (a) may optionally include the application of a binder or binding means to retain or stabilise the adjacent tapes, such that increased production speeds are attainable.

With the claimed process, a multilayered material sheet substantially devoid of overlapping regions, i.e. regions with increased areal density, may be readily produced. Material sheets thus produced have improved antiballistic properties with respect to a material sheet with regions of overlap.

Preferably, the plurality of drawn polymer tapes is unwound from an unwinding station and step (d) is performed by folding the plurality of drawn polymer tapes at least partly onto itself. More preferably, the plurality of drawn polymer tapes is positioned such that the first monolayer forms an angle β with respect to the direction of movement of the substrate, and folding is performed such that the fold line extends about parallel to the direction of movement of the substrate. The process according to the invention is further characterized in that the angle β is between 40 and 50 degrees, whereby the most preferred angle β is about 45 degrees.

Another preferred process according to the invention is characterized in that the second monolayer is at least partly adhered to the first monolayer. This may easily be accomplished by for instance ultrasonic welding, addition of a low melting film, an adhesive, or by any other method of bonding layers together. Adherence of the second monolayer to the first is preferably sufficiently strong to enable transportation of the assembly of monolayers without substantial relative movement of the separate tapes and/or monolayers.

According to the process of the invention, a multilayered material sheet is produced wherein the draw direction of two subsequent monolayers in the stack differs by an angle of α. For the preferred process in which the fold line extends about parallel to the direction of movement of the substrate, the angle α=2β. Although the angle α may be selected within wide ranges, angle α is preferably between 45 and 135°, more preferably between 65 and 115° and most preferably between 80 and 100°. In the latter preferred range a particularly preferred angle α is about 90°. A material produced according to this preferred embodiment is denoted as a cross-ply in the art.

The multilayer material sheet according to the invention is particularly useful in manufacturing ballistic resistant articles, such as vests or armoured plates. Ballistic applications comprise applications with ballistic threat against projectiles of several kinds including against armor piercing, so-called AP bullets and hard particles such as e.g. fragments and shrapnel.

The ballistic resistant article according to the invention comprises at least 2 unidirectional monolayers, preferably at least 10 unidirectional monolayers, more preferably at least 20 unidirectional monolayers, even more preferably at least 30 unidirectional monolayers and most preferably at least 40 unidirectional monolayers. The draw direction of two subsequent monolayers in the stack differs by an angle of α. The angle α is preferably between 45 and 135°, more preferably between 65 and 115° and most preferably between 80 and 100°.

Preferably the ballistic resistant article according to the invention comprises a further sheet of inorganic material selected from the group consisting of ceramic; metal, preferably aluminum, magnesium titanium, nickel, chromium and iron or their alloys; glass; graphite, or combinations thereof. Particularly preferred is metal. In such case the metal in the metal sheet preferably has a melting point of at least 350° C., more preferably at least 500° C., most preferably at least 600° C. Suitable metals include aluminum, magnesium, titanium, copper, nickel, chromium, beryllium, iron and copper including their alloys as e.g. steel and stainless steel and alloys of aluminum with magnesium (so-called aluminum 5000 series), and alloys of aluminum with zinc and magnesium or with zinc, magnesium and copper (so-called aluminum 7000 series). In said alloys the amount of e.g. aluminum, magnesium, titanium and iron preferably is at least 50 wt %. Preferred metal sheets comprising aluminum, magnesium, titanium, nickel, chromium, beryllium, iron including their alloys. More preferably the metal sheet is based on aluminum, magnesium, titanium, nickel, chromium, iron and their alloys. This results in a light antiballistic article with a good durability. Even more preferably the iron and its alloys in the metal sheet have a Brinell hardness of at least 500. Most preferably the metal sheet is based on aluminum, magnesium, titanium, and their alloys. This results in the lightest antiballistic article with the highest durability. Durability in this application means the lifetime of a composite under conditions of exposure to heat, moisture, light and UV radiation. Although the further sheet of material may be positioned anywhere in the stack of monolayers, the preferred ballistic resistant article is characterized in that the further sheet of material is positioned at the outside of the stack of monolayers, most preferably at least at the strike face thereof.

The ballistic resistant article according to the invention preferably comprises a further sheet of the above described inorganic material having a thickness of at most 100 mm. Preferably the maximum thickness of the further sheet of inorganic material is 75 mm, more preferably 50 mm, and most preferably 25 mm. This results in the best balance between weight and antiballistic properties. Preferably, in the event that the further sheet of inorganic material is a metal sheet, the thickness of the metal sheet, is at least 0.25 mm, more preferably at least 0.5 mm, and most preferably at least 0.75 mm. This results in even better antiballistic performance.

The further sheet of inorganic material may optionally be pre-treated in order to improve adhesion with the multilayer material sheet. Suitable pre-treatment of the further sheet includes mechanical treatment e.g. roughening or cleaning the surface thereof by sanding or grinding, chemical etching with e.g. nitric acid and laminating with polyethylene film.

In another embodiment of the ballistic resistant article a bonding layer, e.g. an adhesive, may be applied between the further sheet and the multilayer material sheet. Such adhesive may comprise an epoxy resin, a polyester resin, a polyurethane resin or a vinylester resin. In another preferred embodiment, the bonding layer may further comprise a woven or non woven layer of inorganic fiber, for instance glass fiber or carbon fiber. It is also possible to attach the further sheet to the multilayer material sheet by mechanical means, such as e.g.

screws, bolts and snap fits. In the event that the ballistic resistant article according to the invention is used in ballistic applications where a threat against AP bullets, fragments or improvised explosive devices may be encountered the further sheet is preferably comprises a metal sheet covered with a ceramic layer. In this way an antiballistic article is obtained with a layered structure as follows: ceramic layer/metal sheet/at least two unidirectional sheets with the direction of the fibers in the unidirectional sheet at an angle α to the direction of the fibers in an adjacent unidirectional sheet. Suitable ceramic materials include e.g. alumina oxide, titanium oxide, silicium oxide, silicium carbide and boron carbide. The thickness of the ceramic layer depends on the level of ballistic threat but generally varies between 2 mm and 30 mm. This ballistic resistant article is preferably positioned such that the ceramic layer faces the ballistic threat.

In one embodiment of the present invention, there is provided a process for the manufacture of a ballistic resistant article comprising:
(a) stacking at least 2 unidirectional drawn polymer monolayers, each monolayer comprising at least one unidirectional tape, whereby the draw direction of two subsequent monolayers in the stack differs, whereby at least one monolayer is free of an area of elevated thickness adjacent to and along the substantial length of the longitudinal edges of the at least one unidirectional tape; and a sheet of material selected from the group consisting of ceramic, steel, aluminum, titanium, glass and graphite, or combinations thereof; and
(b) consolidating the stacked sheets under temperature and pressure.

In a preferred embodiment of the present invention there is provided a process for the manufacture of a ballistic resistant article comprising the steps of:
(a) stacking at least 2 unidirectional drawn polymer monolayers, whereby the draw direction of two subsequent monolayers in the stack differs, whereby at least one monolayer, and preferably all monolayers, comprises a plurality of unidirectional tapes of the drawn polymer, aligned in the same direction, whereby adjacent tapes do not overlap, and a further sheet of inorganic material selected from the group consisting of ceramic, steel, aluminum, titanium, glass and graphite, or combinations thereof; and
(b) consolidating the stacked sheets under temperature and pressure.

In an alternative process the stack of at least 2 unidirectional drawn polymer monolayers has been manufactured in a separate process, such as has been described above. This pre-manufactured stack is then combined with the further sheet of material selected from the group consisting of ceramic, steel, aluminum, titanium, glass and graphite, or combinations thereof, in step (a) of the process.

Consolidation for all processes described above may suitably be done in a hydraulic press. Consolidation is intended to mean that the monolayers are relatively firmly attached to one another to form one unit. The temperature during consolidating generally is controlled through the temperature of the press. A minimum temperature generally is chosen such that a reasonable speed of consolidation is obtained. In this respect 80° C. is a suitable lower temperature limit, preferably this lower limit is at least 100° C., more preferably at least 120° C., most preferably at least 140° C. A maximum temperature is chosen below the temperature at which the drawn polymer monolayers lose their high mechanical properties due to e.g. melting. Preferably the temperature is at least 10° C., preferably at least 15° C. and even more at least 20° C. below the melting temperature of the drawn polymer monolayer. In case the drawn polymer monolayer does not exhibit a clear melting temperature, the temperature at which the drawn polymer monolayer starts to lose its mechanical properties should be read instead of melting temperature. In the case of the preferred ultra high molecular weight polyethylene, a temperature below 145° C. generally will be chosen. The pressure during consolidating preferably is at least 7 MPa, more preferably at least 15 MPa, even more preferably at least 20 MPa and most preferably at least 35 MPa. In this way a stiff antiballistic article is obtained. The optimum time for consolidation generally ranges from 5 to 120 minutes, depending on conditions such as temperature, pressure and part thickness and can be verified through routine experimentation. In the event that curved antiballistic articles are to be produced it may be advantageous to first pre-shape the further sheet of material into the desired shape, followed by consolidating with the monolayers and/or multilayer material sheet.

Preferably, in order to attain a high ballistic resistance, cooling after compression moulding at high temperature is carried out under pressure as well. Pressure is preferably maintained at least until the temperature is sufficiently low to prevent relaxation. This temperature can be established by one skilled in the art. When a ballistic resistant article comprising monolayers of ultra high molecular weight polyethylene is manufactured, typical compression temperatures range from 90 to 150° C., preferably from 115 to 130° C. Typical compression pressures range between 100 to 300 bar, preferably 100 to 180 bar, more preferably 120 to 160 bar, whereas compression times are typically between 40 to 180 minutes.

The multilayered material sheet and antiballistic article of the present invention are particularly advantageous over previously known antiballistic materials as they provide at least the same level of protection as the known articles at a significantly lower weight, or an improved ballistic performance at equal weight compared with the known article. Starting materials are inexpensive and the manufacturing process is relatively short and thus cost effective. Since different polymers may be used to produce the multilayered material sheet of the invention properties may be optimized according to the particular application. Besides ballistic resistance, properties include for instance heat stability, shelf-life, deformation resistance, bonding capacity to other material sheets, formability, and so on.

The invention will now be further explained by the following FIGS. 1-4, without however being limited thereto.

Figure 1:
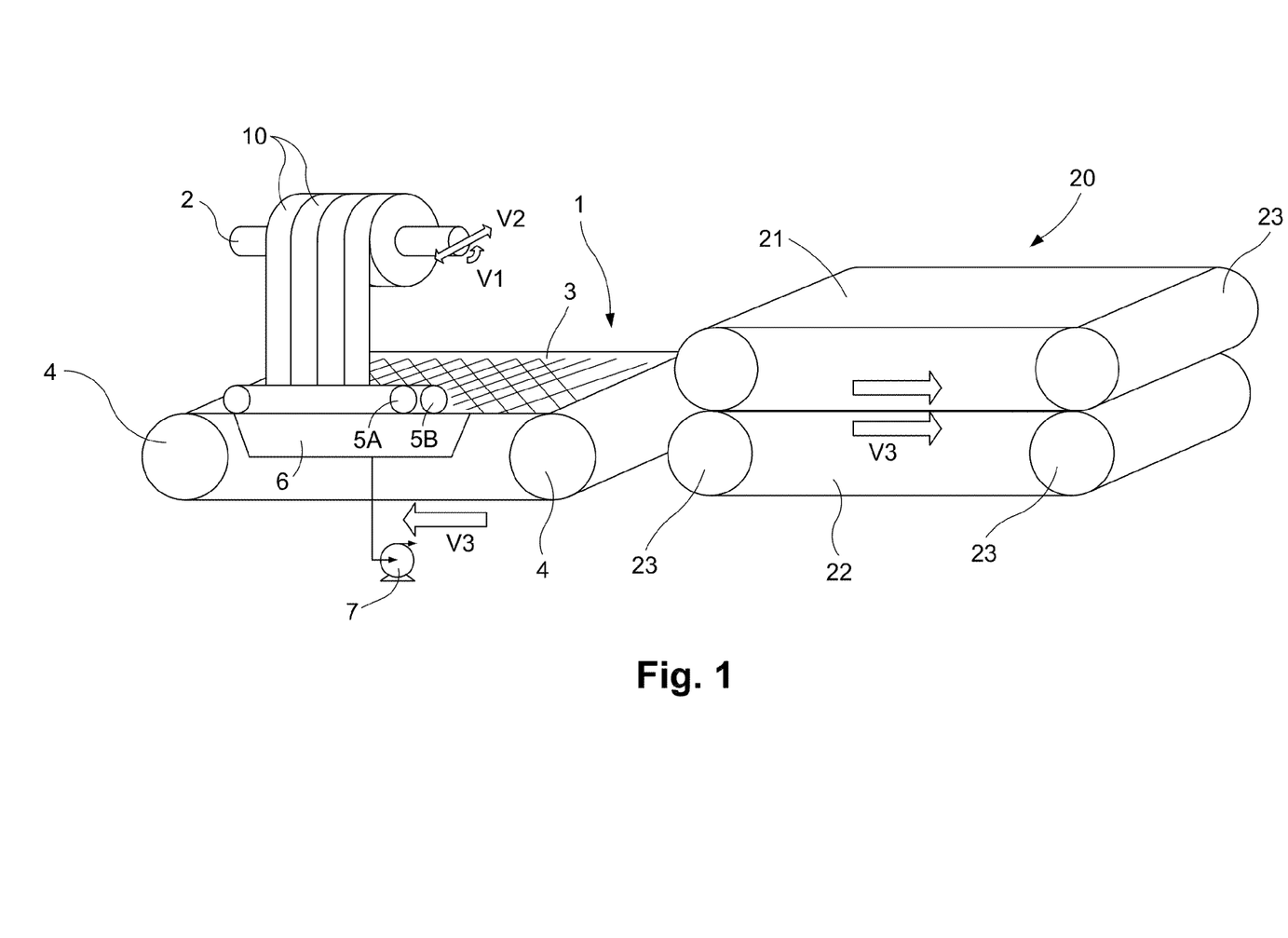
FIG. 1 shows an apparatus for producing multilayered material sheet of the invention.

FIG. 1 schematically represents an embodiment of an apparatus to carry out the process according to the invention.

Figure 2:
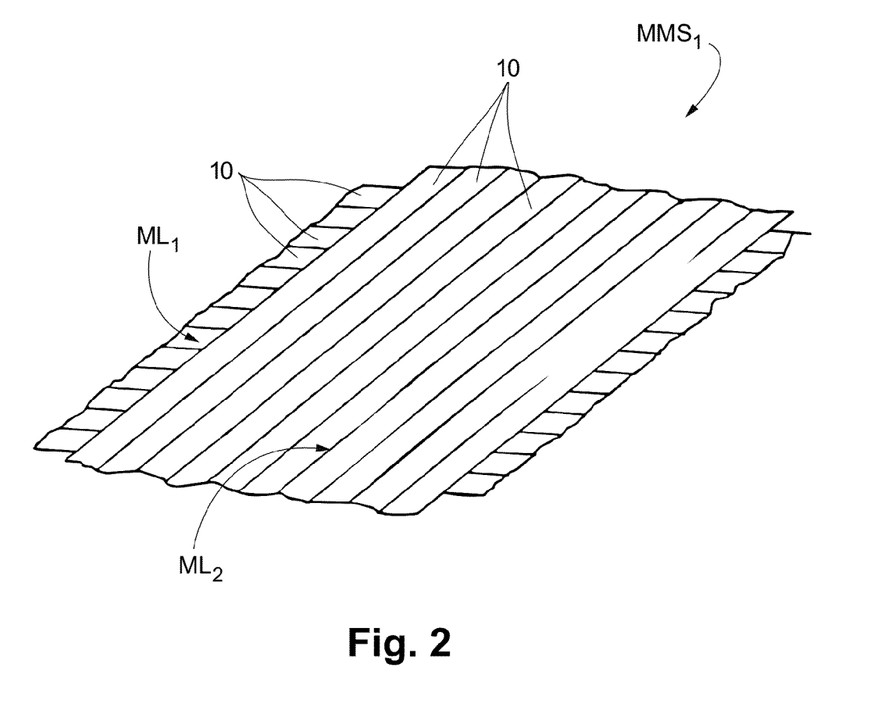
FIG. 2 is a graphical presentation of a multilayered material sheet according to the invention.

FIG. 2 schematically represents a multilayer material sheet

Figure 3:
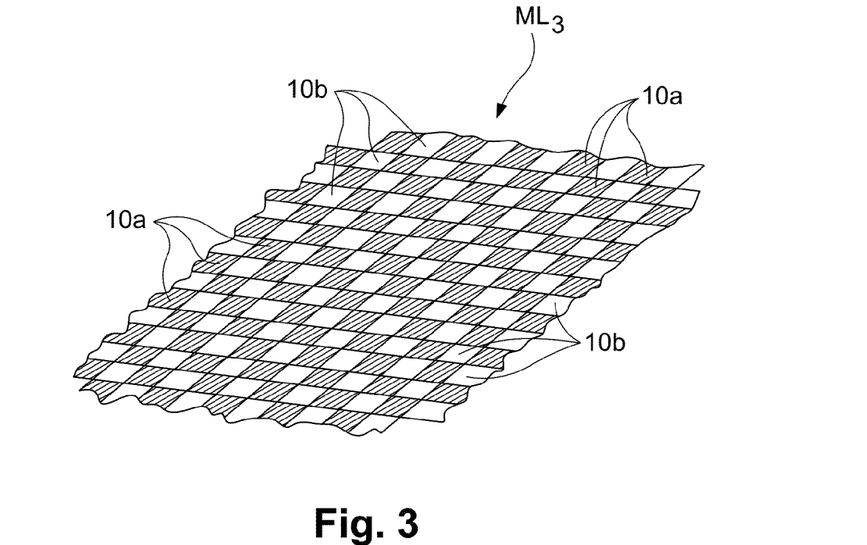
FIG. 3 is a graphical presentation of a monolayer according to the invention.

FIG. 3 schematically represents a monolayer of woven tapes

Figure 4:
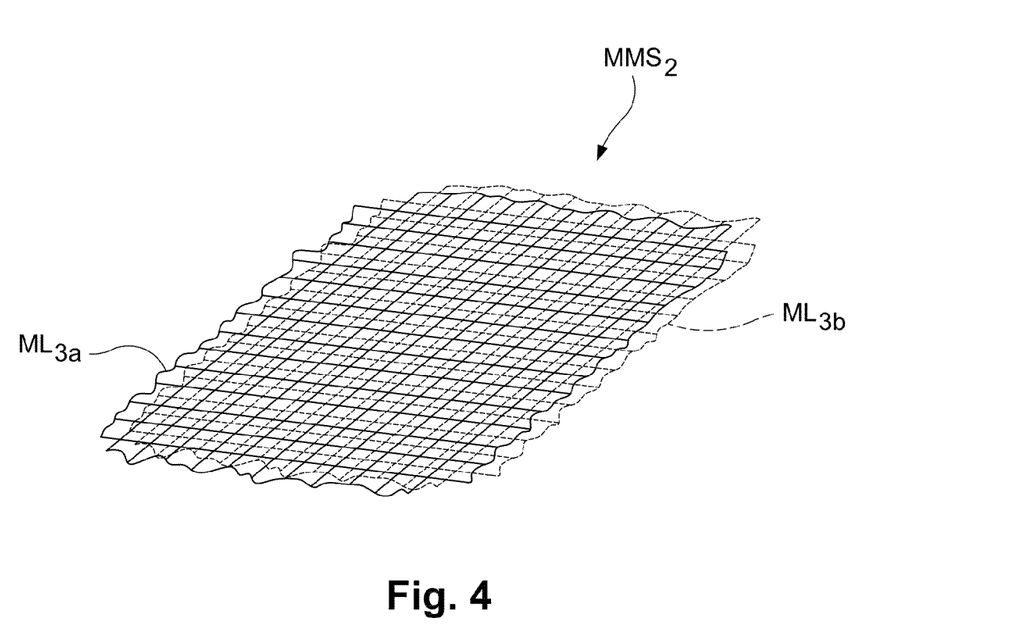
FIG. 4 is a graphical presentation of a multilayer material sheet according to the invention comprising the monolayer of FIG. 3.

FIG. 4 schematically represents a multilayer material sheet

Referring to FIG. 1, an apparatus 1 to produce a multilayered material sheet of the claimed type is shown. The apparatus comprises means 2 for providing a plurality of drawn polymer tapes 10. The means 2 may for instance comprise an unwinding station for rolls of polymer tapes 10. Polymer tapes 10 are aligned such that each tape 10 is oriented in parallel to adjacent tapes 10. Apparatus 1 further comprises a moving substrate 3, which, in the embodiment shown is a belt, driven by two cylindrical rolls 4. The belt 3 is movable at a speed V3 in the direction shown by the arrow. The plurality of tapes 10 are positioned onto substrate 3 by passing the tapes 10 through a set of nip rollers (5a, 5b). The plurality of tapes 10 are held onto substrate 3 by holding means, for instance by perforating the substrate 3, and providing a space 6, which can be put under vacuum by pump 7 below substrate 3.

Behind the movable substrate 3, a belt press 20 is positioned, comprising two heated surfaces (21, 22), driven by cylindrical rolls 23.

The process according to the invention comprises unwinding a plurality of uniaxially drawn polymer tapes 10 from unwinding station 2 at a speed V1. The tapes 10 are positioned such that adjacent tapes do not substantially overlap, and there are substantially no gaps (typically less than 2 mm) between adjacent tapes. Tapes 10 are then fed through the set of nip rollers (5a, 5b). As shown in FIG. 1, the assembly of unwinder 2 and set of nip rollers (5a, 5b) traverses up and down the substrate 3 in the transverse direction at a speed V2. Vacuum belt substrate 3 moves at a speed V3 in a direction essentially perpendicular to the transverse direction. The ratio between V2 and V3 is chosen such that the plurality of tapes 10 is positioned onto the moving substrate 3 at an angle of about 45 degrees with respect to the direction of movement of the substrate 3, thereby forming a first monolayer. The first monolayer is held onto the moving substrate 3 by the suction produced by the vacuum means (6, 7). When the unwinder 2 reaches the side of the moving substrate 3, its direction of movement is reversed, and the unwinder 2 moves in the opposite direction. Thereby, the plurality of drawn polymer tapes 10 is folded at least partly onto itself. More in particular, the plurality of drawn polymer tapes 10 is folded such that the fold line extends about parallel to the direction of movement of the substrate 3. Thereby a second monolayer is positioned onto the first monolayer, whereby the direction of the second monolayer makes an angle of about 90 degrees with respect to the first. In order to ensure that the assembly of first and second monolayer can be transported without relative movement of the separate tapes and/or monolayers, the second monolayer of tapes is adhered to the first monolayer at least partly. Suitable means to do this include but are not limited to ultrasonic welding, addition of a low melting film, an adhesive, a hot melt, or any other method of bonding layers together.

Finally, the thus formed assembly of monolayers is fed into a belt press or calander 20 for final consolidation of the multilayered material sheet. In the belt press or calander 20 the stacked plurality of tapes are bonded at a temperature close to the melting point of the tapes. The resulting multilayered material is in the described embodiment a cross plied two layer material made from tapes, with the direction of the tapes at an angle of about 45 degrees to the direction of movement of substrate 3.

The width of the plurality of tapes 10 on means 2 is determined by the width of the multilayered material on substrate 3 that is to be positioned onto the belt press or calander number 20. In the event that the angle β of the tapes with the direction of movement of substrate 3 is 45° C., the width of the plurality of tapes 10 is $\sqrt{2}$ * width of the multilayered material.

Referring to FIG. 2, a graphical presentation of multilayered material sheet $MMS_1$ according to the invention comprising a consolidated stack of two unidirectional monolayers $ML_1$, $ML_2$ of drawn polymer tapes 10, whereby the draw direction of two subsequent monolayers in the stack is rotated 90°, whereby each monolayer $ML_1$, $ML_2$ comprises a plurality of unidirectional tapes 10 of the drawn polymer aligned in the same direction, whereby adjacent tapes do not overlap, is shown. For clarity reasons, the individual tapes 10 extend at the edges of the multilayered material sheet MMS.

Referring to FIG. 3, a graphical presentation of a monolayer $ML_3$ according to the invention whereby the monolayer is built up of a plurality of unidirectional tapes 10a 10b of the drawn polymer, aligned such that they form a woven structure is shown Referring to FIG. 4, a graphical presentation of a multilayer material sheet $MMS_2$ according to the invention comprising the monolayer of FIG. 3 denoted as $ML_{3a}$ (in full lines), with a second monolayer of woven tapes denoted as $ML_{3b}$ (in dotted lines) therebelow is shown. The second monolayer $ML_{3b}$ is positioned such that the seam lines of the respective monolayers $ML_{3a}$ and $ML_{3b}$ are aligned in a staggered fashion.

Test methods as referred to in the present application, are as follows

Intrinsic Viscosity (IV) is determined according to method PTC-179 (Hercules Inc. Rev. Apr. 29, 1982) at 135° C. in decalin, the dissolution time being 16 hours, with DBPC as anti-oxidant in an amount of 2 g/l solution, by extrapolating the viscosity as measured at different concentrations to zero concentration;

Tensile properties (measured at 25° C.): tensile strength (or strength), tensile modulus (or modulus) and elongation at break (or eab) are defined and determined on multifilament yarns as specified in ASTM D885M, using a nominal gauge length of the fiber of 500 mm, a crosshead speed of 50%/min. On the basis of the measured stress-strain curve the modulus is determined as the gradient between 0.3 and 1% strain. For calculation of the modulus and strength, the tensile forces measured are divided by the titre, as determined by weighing 10 metres of fiber; values in GPa are calculated assuming a density of 0.97 g/cm$^3$. Tensile properties of thin films were measured in accordance with ISO 1184(H).

The invention claimed is:

1. A multilayered material sheet comprising:
a consolidated stack of unidirectional monolayers of drawn polymer, said unidirectional monolayers of drawn polymer having a melting temperature, the consolidation of said stack being carried out at a temperature below the melting temperature of the drawn polymer monolayer, wherein
the draw direction of two subsequent monolayers in the stack differs, and wherein
at least one monolayer comprises more than one unidirectional tape of the drawn polymer, each tape comprising longitudinal edges, wherein
the monolayer is free of an area of elevated thickness adjacent to and along the substantial length of the longitudinal edges of the at least one unidirectional tape, and wherein adjacent tapes of the monolayer do not overlap.

2. The multilayered material sheet according to claim 1, wherein the at least one monolayer is free of an area of elevated thickness along and adjacent to the entire length of the longitudinal edges of the at least one unidirectional tape.

3. The multilayered material sheet according to claim 1, wherein at least one monolayer comprises a plurality of unidirectional tapes of the drawn polymer and wherein the gap between adjacent tapes is smaller than 10% of the width or the adjacent unidirectional tapes.

4. The multilayered material sheet according to claim 3, wherein the gap between adjacent tapes is smaller than 5% of the width of the adjacent unidirectional tapes.

5. The multilayered material sheet according claim 1, wherein the longitudinal edges of the adjacent tapes at least partially abut each other.

6. The multilayered material sheet according claim 5, wherein the adjacent tapes at least partially fixedly abut each other.

7. The multilayered material sheet according to claim 1, wherein the thickness of at least one monolayer does not exceed 100 microns.

8. The multilayered material sheet according to claim 7, wherein the thickness of at least one monolayer does not exceed 29 microns.

9. The multilayered material sheet according to claim 7, wherein the thickness of the at least one monolayer is greater than 10 microns.

10. The multilayered material sheet according to claim 1, wherein the strength of at least one monolayer is at least 0.9 GPa.

11. The multilayered material sheet according to claim 10, wherein the strength of at least one monolayer is at least 1.5 GPa.

12. The multilayered material sheet according to claim 1, wherein the polymer is selected from the group consisting of polyolefins, polyesters, polyvinyl alcohols, polyacrylonitriles, polyamides, especially poly(p-phenylene teraphthalamide), liquid crystalline polymers and ladder-like polymers, such as polybenzimidazole or polybenzoxazole, especially poly(1,4-phenylene-2,6-benzobisoxazole), or poly(2,6-diimidazo[4,5-b-4',5-elpyridinylene-1 ,4-(2,5-dihydroxy)phenylene).

13. The multilayered material sheet according to claim 12, wherein the polyolefin comprises ultra high molecular weight polyethylene.

14. A ballistic resistant article comprising a multilayered material sheet according to claim 1.

15. The ballistic resistant article according to claim 14, comprising at least 40 unidirectional monolayers.

16. The ballistic resistant article according to claim 14, comprising a further sheet or inorganic material selected from the group consisting of ceramic, steel, aluminum, magnesium titanium, nickel, chromium and iron or their alloys, glass and graphite, or combinations thereof.

17. The ballistic resistant article according to claim 15, wherein the further sheet of inorganic material is positioned at the outside of the stack of monolayers at least at the strike face thereof.

18. The ballistic resistant article according to claim 16, wherein the thickness of the further sheet of inorganic material is at most 50 mm.

19. The ballistic resistant article according to claim 16, comprising a bonding layer positioned between the further sheet of inorganic material and the multilayered material sheet, and wherein the bonding layer comprises a woven or non woven layer of inorganic fiber.

20. The multilayered material sheet according to claim 1, wherein at least one monolayer comprises a plurality of unidirectional tapes of the drawn polymer, aligned such that the plurality of unidirectional tapes form a woven fabric.

* * * * *